United States Patent [19]

Proctor et al.

[11] Patent Number: 5,744,769
[45] Date of Patent: Apr. 28, 1998

[54] ELECTRICAL SWITCH FOR USE IN AN AUTOMOTIVE VEHICLE

[75] Inventors: Thomas H. Proctor, Sterling Heights; James B. Wright, Warren; LeRoy A. Poleschuk, White Lake; Ernest Peter Valade, Woodhaven, all of Mich.

[73] Assignee: United Technologies Automotive, Inc., Dearborn, Mich.

[21] Appl. No.: 431,899

[22] Filed: May 1, 1995

Related U.S. Application Data

[63] Continuation-in-part of Ser. No. 380,090, Jan. 30, 1995, Pat. No. 5,575,177, which is a continuation-in-part of Ser. No. 120,676, Sep. 13, 1993, Pat. No. 5,385,067.

[51] Int. Cl.$^6$ ........................................ H01H 9/00
[52] U.S. Cl. ........................... 200/61.54; 200/4; 200/6 A
[58] Field of Search ........................ 200/4, 5 R, 5 A, 200/6 R, 6 A, 17 R, 18, 61.27, 61.54, 293, 295, 303, 307, 332, 335, 339; 307/9.1, 10.1

[56] References Cited

U.S. PATENT DOCUMENTS

| | | | |
|---|---|---|---|
| Re. 34,359 | 8/1993 | Matsumoto et al. | 74/493 |
| 3,814,871 | 6/1974 | Osika | 200/6 A |
| 3,849,613 | 11/1974 | Kawai | 200/61.27 |
| 3,914,566 | 10/1975 | Wendling | 200/61.27 |
| 3,988,558 | 10/1976 | Josemans et al. | 200/335 |
| 4,123,632 | 10/1978 | Muto | 200/61.27 |
| 4,280,027 | 7/1981 | Comerford et al. | 200/6 A |
| 4,426,951 | 1/1984 | Nishizima | 116/46 |
| 4,503,296 | 3/1985 | Iwata et al. | 200/61.27 |
| 4,564,732 | 1/1986 | Lancaster et al. | 200/307 |
| 4,590,341 | 5/1986 | Iwata et al. | 200/61.54 |
| 4,599,500 | 7/1986 | Wilcox | 200/61.54 |
| 4,647,736 | 3/1987 | Furuhashi et al. | 200/61.27 |
| 4,721,834 | 1/1988 | Mark et al. | 200/6 A |
| 4,739,131 | 4/1988 | Maeda | 200/61.27 |
| 4,753,121 | 6/1988 | Venable et al. | 74/493 |
| 4,793,204 | 12/1988 | Kubasiak | 74/493 |
| 4,816,662 | 3/1989 | Kyoden | 200/5 R |
| 4,840,078 | 6/1989 | Shitanoki | 73/484 R |
| 4,888,456 | 12/1989 | Suzuki | 200/61.27 |
| 4,900,946 | 2/1990 | Williams et al. | 307/10.1 |
| 4,981,049 | 1/1991 | Venable et al. | 74/493 |
| 5,030,802 | 7/1991 | Noro | 200/61.27 |
| 5,047,596 | 9/1991 | Ebishi | 200/4 |
| 5,068,499 | 11/1991 | Kuratani | 200/6 A |
| 5,153,563 | 10/1992 | Tanaka | 200/6 A |

(List continued on next page.)

FOREIGN PATENT DOCUMENTS

| | | | |
|---|---|---|---|
| 1345468 | 10/1963 | France . | |
| 2246171 | 4/1975 | France . | |
| 2262474 | 9/1975 | France | H05K 7/02 |
| 3146271A1 | 6/1983 | Germany | H01H 25/00 |

OTHER PUBLICATIONS

"Seat and Steering–Column Adjustment", Central Locking System, Automotive Handbook Bosch, 1993, pp. 724–725.
German Gazette Entry DE 92 12 458 Mar. 4, 1993.
Photographs of a powered tilting and telescoping steering column switch (prior to May 1994).
Photographs of a motorized exterior mirror switch (prior to May 1994).

*Primary Examiner*—Michael L. Gellner
*Assistant Examiner*—Michael A. Friedhofer
*Attorney, Agent, or Firm*—Harness, Dickey & Pierce, P.L.C.

[57] ABSTRACT

An electrical switch for use in an automotive vehicle includes an actuator and a carrier movable to electrically actuate a steering column tilting device and a steering column telescoping device. A post and a receptacle assist to align the carrier during its linear switching movement. An actuator assembly is provided which includes a shaft, a partially spherical ball, a first set of crossed arms and a second set of crossed arms while a centering spring biases an actuator toward a centralized neutral position. A modularized electrical switch is also mechanically and electrically connected to a second circuit and housing in a single assembly motion.

15 Claims, 11 Drawing Sheets

U.S. PATENT DOCUMENTS

| | | | |
|---|---|---|---|
| 5,187,647 | 2/1993 | Kaneko | 361/413 |
| 5,196,662 | 3/1993 | Hofmann | 200/61.54 |
| 5,200,584 | 4/1993 | Nagaya | 200/4 |
| 5,216,399 | 6/1993 | Kamada et al. | 335/190 |
| 5,227,594 | 7/1993 | Russo | 200/6 A |
| 5,269,562 | 12/1993 | Peitsmeier et al. | 280/775 |
| 5,313,028 | 5/1994 | DuRocher | 200/61.27 |
| 5,385,067 | 1/1995 | Wiersing et al. | 74/484 R |

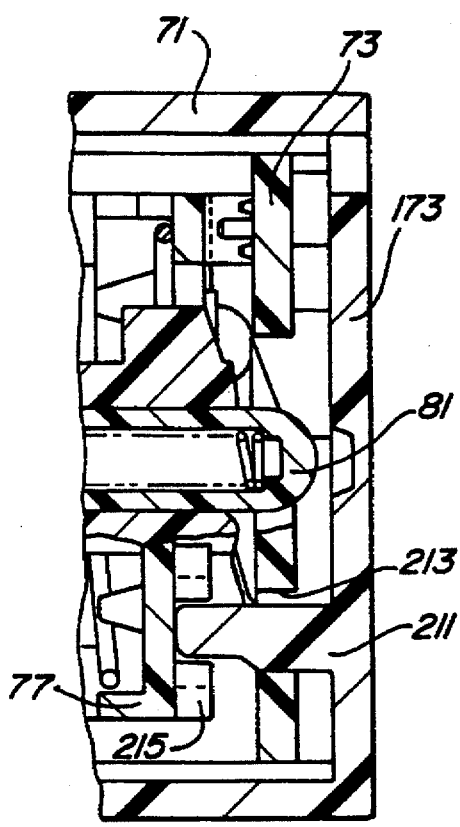
Fig - 9
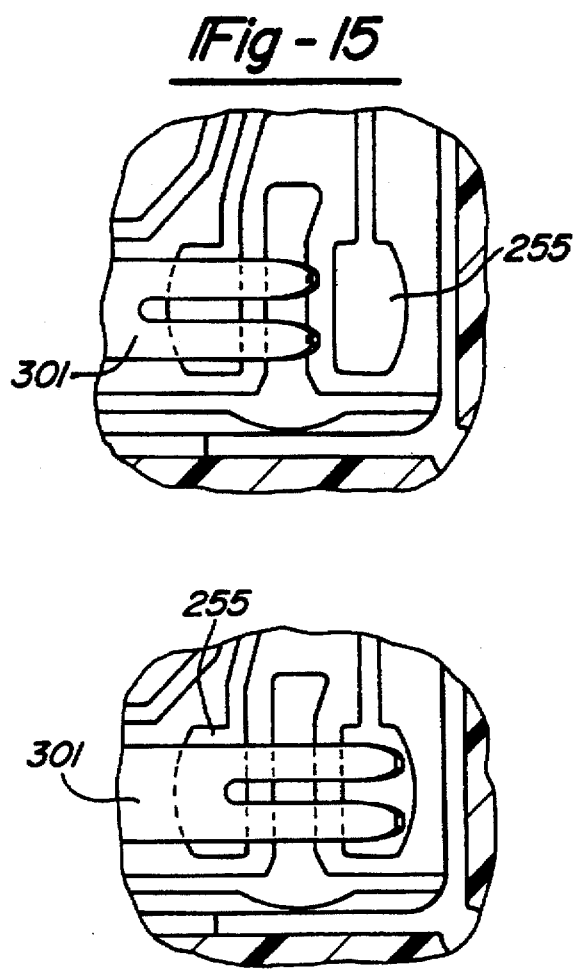
Fig - 15
Fig - 16
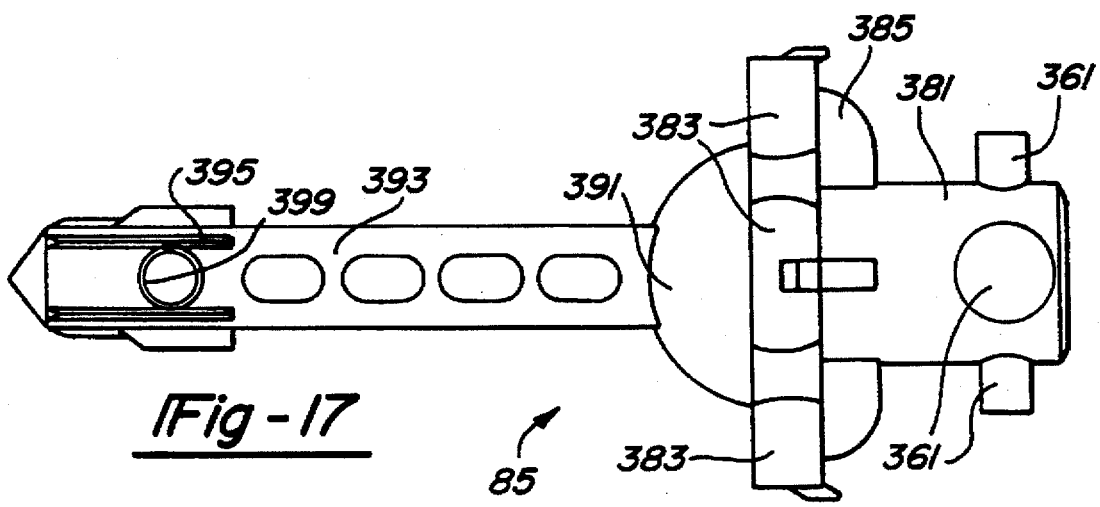
Fig - 17

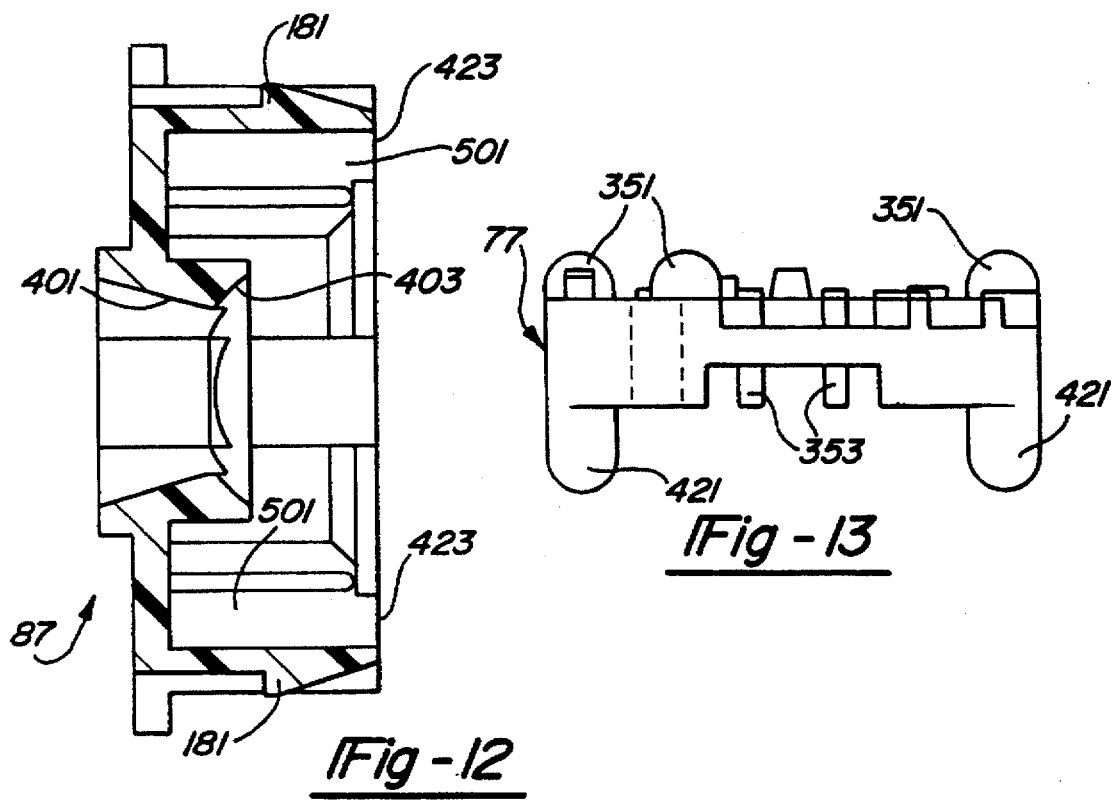
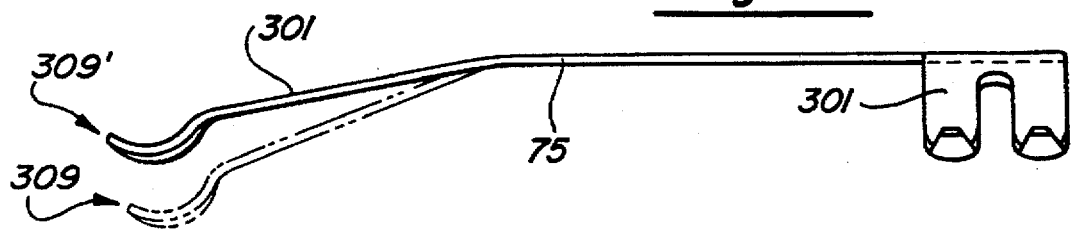
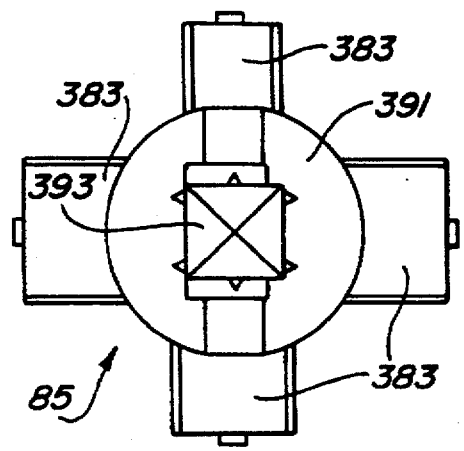

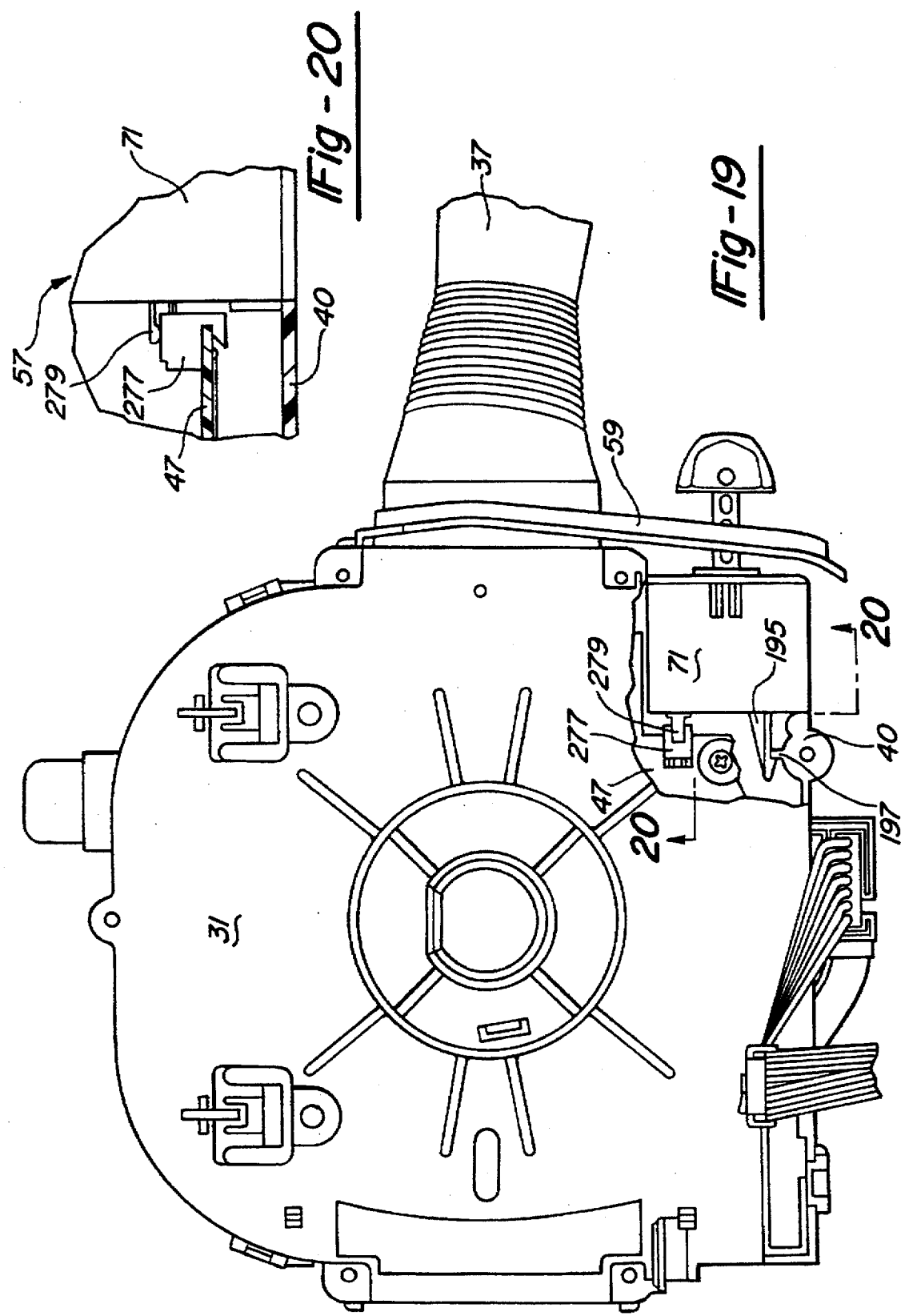

ELECTRICAL SWITCH FOR USE IN AN AUTOMOTIVE VEHICLE

CROSS REFERENCE TO RELATED APPLICATIONS

This is a continuation-in-part of a patent application Ser. No. 08/380,090, filed on Jan. 30, 1995, now patened as U.S. Pat. No. 5,575,177, which was a continuation-in-part of a patent application Ser. No. 08/120,676, filed on Sep. 13,1993 and issued as U.S. Pat. No. 5,385,067.

BACKGROUND OF THE INVENTION

This invention relates generally to electrical switches and specifically to an electrical switch and components thereof for use in an automotive vehicle.

Many automotive vehicles have steering columns which are manually tiltable along a vertical plane in relation to the adjacent vehicle body. This tilting feature provides added driver comfort by allowing a steering wheel attached to the steering column through a steering shaft to be upwardly tilted for allowing easy driver entrance and egress relative to the driver seat. The driver can then manually pull a tilting lever and manually tilt the steering wheel and column downwardly to an operable position.

It is also known to provide inwardly and outwardly telescoping steering columns, in addition to the tilting feature, which allow the steering wheel to move toward and away from the vehicle driver. Examples of manually operated tilting and telescoping steering columns are disclosed within the following U.S. patents: U.S. Pat No. 4,981,049 entitled "Tilt-Telescope Steering Column" which issued to Venable et al. on Jan. 1, 1991; U.S. Pat. No. 4,793,204 entitled "Tilt and Telescope Steering Column Having a Single Control" which issued to Kubasiak on Dec. 27, 1988; U.S. Pat. No. 4,753,121 entitled "Tilt-Telescope Steering Column" which issued to Venable on Jun. 28, 1988; and U.S. Pat. No. 4,599,500 entitled "Tilt Steering Column Head Mounted Switch Operating Control" which issued to Wilcox on Jul. 8, 1986. More recently, the tilting and telescoping movement of the steering column has been remotely powered through use of electric motors or hydraulic pump and piston systems. Examples of such powered constructions are disclosed within the following U.S. patents: U.S. Pat. No. RE. 34,359 entitled "Electric Steering Apparatus" which reissued to Matsumoto et al. on Aug. 31, 1993; and U.S. Pat. No. 5,269,562 entitled "Axially Adjustable Steering Column for Vehicles" which issued to Peitsmeier et al. on Dec. 14, 1993; the disclosures of which are incorporated by reference herewithin.

A conventional electric switch is known which controls movement of a powered tilting and telescoping steering column. This switch consists of a lever member having a post extending therefrom upon which is mounted an operator accessible button. A spring mounted plunger projects from a pocket within an oppositely extending boss. A platform is disposed upon the lever member adjacent the boss, a semi-spherical ball is mounted upon the platform next to the post for engaging with a protruding and outwardly visible matching semi-spherical section of a bezel. Four arms outwardly extend in a cross-like manner from edges of the platform for engaging within perpendicularly oriented channels projecting inwardly from the bezel walls. The button and lever member can be moved in any direction without limitation. Furthermore, a printed circuit board is mounted below the lever member such that one of four nibs projecting from the platform, parallel to the boss, can depress the adjacent one of four distinct, longitudinally movable popple switches mounted to the circuit board. A polymeric plate is disposed between the printed circuit board and the platform. This plate has four clearance holes coincidental with the four popple switches for allowing the nibs to access these switches. A cross-like detent pattern is present within the center of the plate for engagement with the plunger. This switch appears to be expensive to produce due to the requisite popple switches. Moreover, these popple switches provide a redundant switch within the overall tilting/telescoping control switch. This switch is also electrically coupled through a discretely wired electrical connector.

Another switch is known which operates a pair of motorized exterior mirrors within an automotive vehicle. This four-way switch has a lever member consisting of a post upon which an operator accessible button is mounted and a downwardly facing semi-spherical ball for engagement with a mating polymeric shelf with a partially spherical receptacle for engaging the ball. Four fingers project longitudinally downward from the ball of the lever member for engaging within a central aperture of a carriage. The carriage consists of four downwardly projecting bosses with each having a compression spring, a flat contactor spanning between two pairs of bosses, and a conductive ball bearing. Each ball bearing can be moved in response to lever member movement thereby electrically interfacing with printed circuits of a rigid printed circuit board. Six conductive terminals project from an opposite face of the circuit board for attachment to an electrical connector. This actuating member is limited to four-way movement. However, pivoting movement of the actuating member primarily relies upon interface between a transverse edge of a platform adjacent the ball against a retainer. A pair of flexible snap-fit fingers and a pair of stationary barbs project form external walls of the bezel for engagement with an armrest bezel, center console bezel or the like. These two disclosed switches have been found to provide a sloppy and inaccurate feel for the vehicle driver.

SUMMARY OF THE INVENTION

In accordance with the present invention, a preferred embodiment of an electrical switch for use in an automotive vehicle includes an actuator and a carrier movable to electrically actuate a steering column tilting device and a steering column telescoping device. In another aspect of the present invention, a post and a receptacle assist to align the carrier during its linear switching movement. In a further aspect of the present invention, an actuator assembly is provided which includes a shaft, a partially spherical ball, a first set of crossed arms and a second set of crossed arms. Still another aspect of the present invention employs a centering spring for biasing an actuator toward a centralized neutral position. In yet another aspect of the present invention, a modularized electrical switch is mechanically and electrically connected to a second circuit and housing in a single assembly motion.

The electrical switch of the present invention is advantageous over traditional devices in that the present invention is more cost effective to manufacture and assemble. Furthermore, the present invention electrical switch achieves an integration of switching functions, electrical connection and mechanical attachment, both internally and externally, thereby improving electrical and mechanical reliability. Furthermore, the present invention reduces undesirable free play and imparts a higher quality and accurate switching feel. Additional advantages and features of the present invention will become apparent from the following description and appended claims, taken in conjunction with the accompanying drawings.

BRIEF DESCRIPTION OF THE DRAWINGS

FIG. 9 is a fragmentary longitudinal sectional view, taken along line 9—9 of FIG. 7, showing the preferred embodiment electrical switch of the present invention;

FIG. 12 is a longitudinal sectional view, taken along line 12—12 of FIG. 11, showing a cover employed in the preferred embodiment electrical switch of the present invention;

FIG. 13 is a side elevational view showing a carrier employed in the preferred embodiment electrical switch of the present invention;

FIG. 14 is a side elevational view showing a contactor employed in the preferred embodiment electrical switch of the present invention;

FIGS. 15 and 16 are fragmentary and enlarged top elevational views showing different positions of the contactor in relation to a printed circuit board employed in the preferred embodiment electrical switch of the present invention;

FIG. 17 is a side elevational view showing an actuator employed in the preferred embodiment electrical switch of the present invention;

FIG. 18 is a top elevational view showing the actuator employed in the preferred embodiment electrical switch of the present invention;

FIG. 19 is a front elevational view, with portions broken away therefrom, showing the preferred embodiment electrical switch of the present invention assembled to the turn signal cancellation mechanism;

FIG. 20 is a sectional view, taken along line 20—20 of FIG. 19, showing the preferred embodiment electrical switch of the present invention assembled to the turn signal cancellation mechanism.

DETAILED DESCRIPTION OF THE PREFERRED EMBODIMENT

Figure 1:
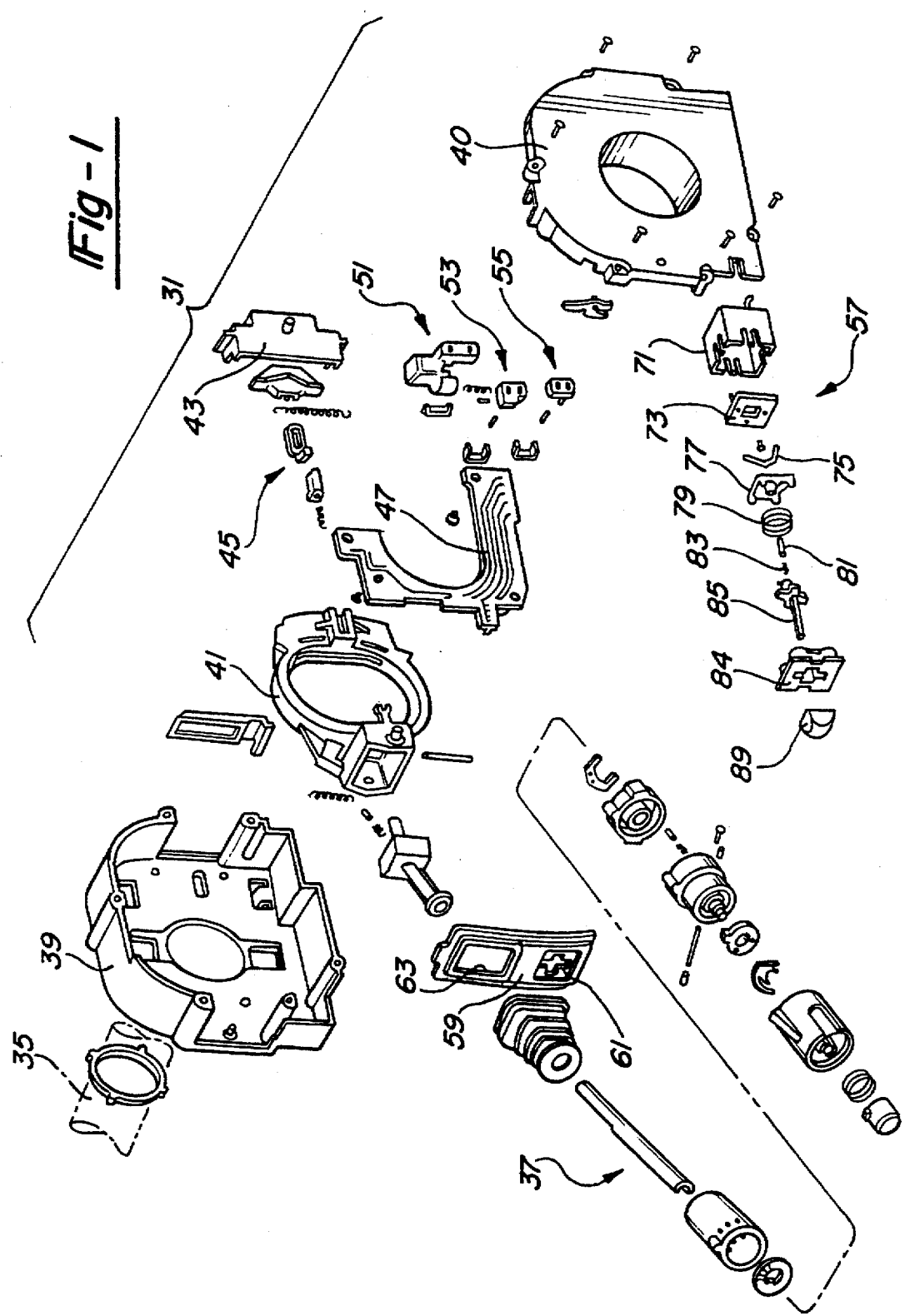
FIG. 1 an exploded perspective view, as seen from the rear of an automotive vehicle, showing the preferred embodiment of an electrical switch of the present invention in relation to a turn signal cancellation mechanism.
Figure 2:
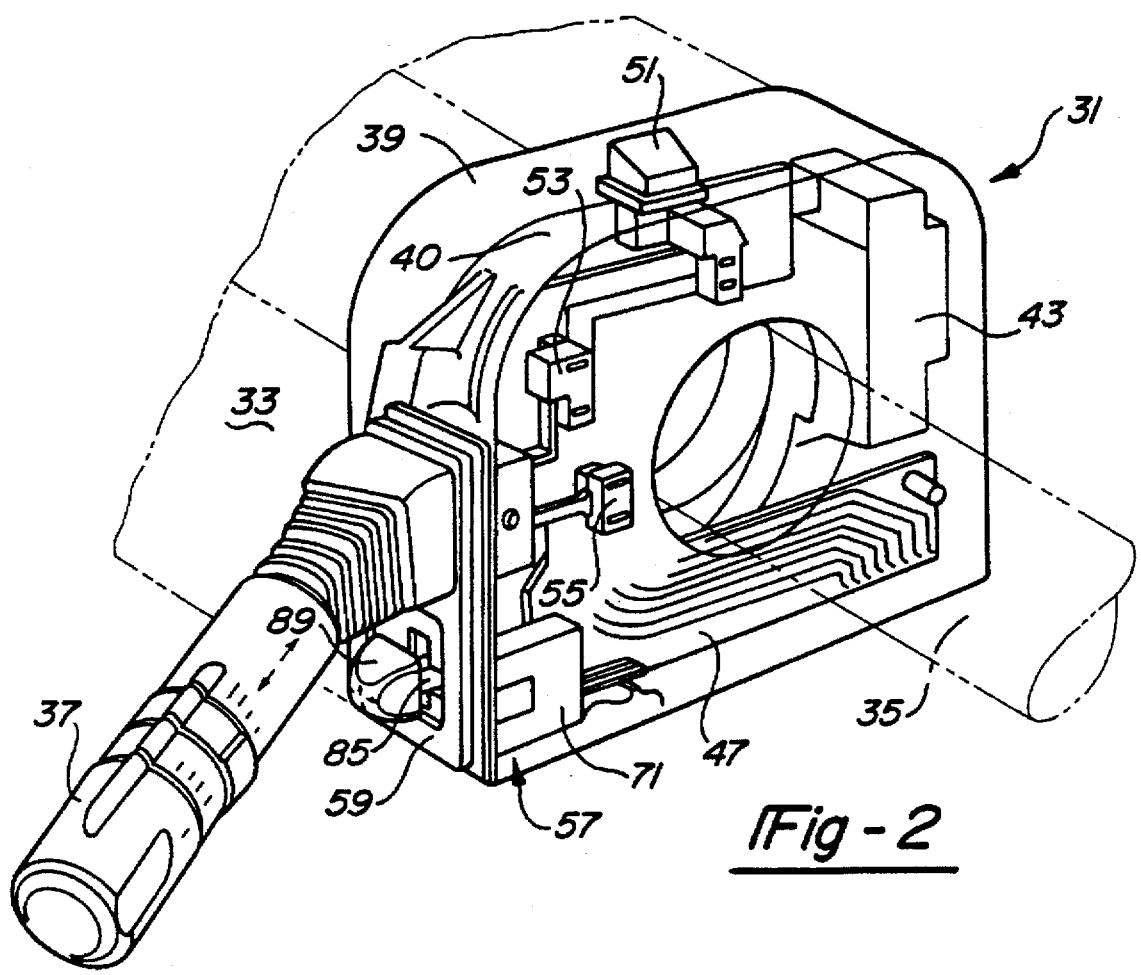
FIG. 2 is a perspective view showing the preferred embodiment electrical switch of the present invention assembled to the turn signal cancellation mechanism.
Figure 3:
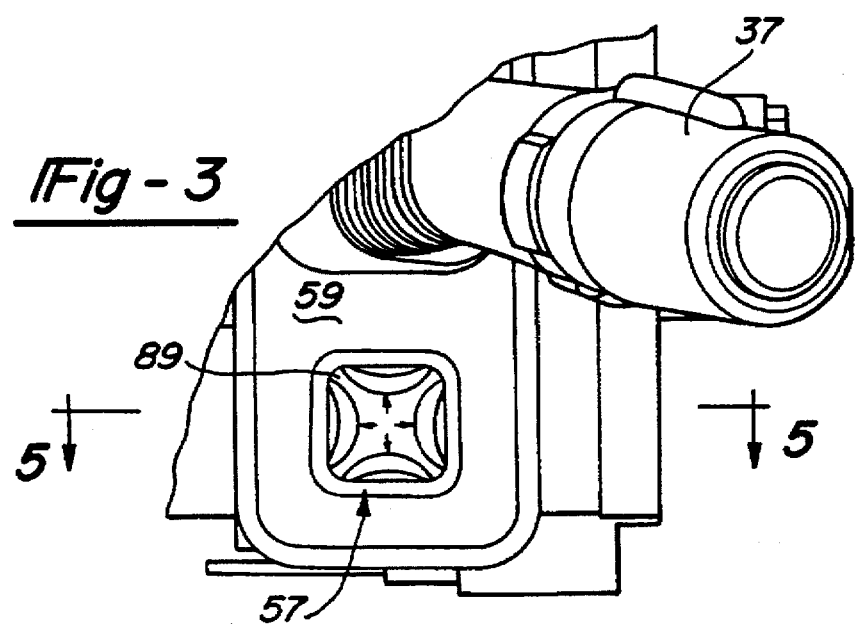
FIG. 3 is a fragmentary side elevational view showing the preferred embodiment electrical switch of the present invention assembled to the turn signal cancellation mechanism.

Referring to FIGS. 1–4, a turn signal cancellation mechanism 31 fits upon a steering column 33 of an automotive vehicle with a steering shaft 35 rotatably extending through a central part thereof. Steering column 33 and steering shaft 35 are tiltable between an upward extreme position and a downward extreme position along a substantially vertical plane. Steering column 33 and steering shaft 35 are also telescopically movable toward and away from a vehicle driver. These tilting and telescoping movements can be driven by one of more electrical motors, a hydraulic pump and piston system or through other known driving means. Turn signal cancellation mechanism 31 preferably has a stalk or handle 37, a body portion 39 of a turn signal housing, a cover portion 40 of a turn signal housing, a turn signal actuator 41, a turn signal detent structure 43, a pawl 45 and a main circuit board 47. A hazard switch 51, headlight dimmer switch 53, turn signal switch 55 and the preferred embodiment steering column tilting/telescoping electrical switch 57 of the present invention are also provided within turn signal cancellation mechanism 31. A bezel 59 is also provided with a four-way slotted aperture 61, having a cross-like pattern, for receiving portions of tilting/telescoping electrical switch 57. Bezel 59 is further provided with a somewhat rectangular opening through which portions of handle 37 extend. Bezel 59 also has a pair of oppositely extending L-shaped legs protruding from a non-appearance surface for engaging with portions of turn signal body 39 and cover 40.

The preferred embodiment of the tilting/telescoping electrical switch 57 of the present invention includes a housing 71, a rigid printed circuit board 73, a conductive contactor 75, a carrier 77, a centering compression spring 79, a plunger 81, a return spring 83, an actuator 85, a cover 87 and a driver accessible button 89. As can best be observed in FIGS. 4, 5, 10 and 19, housing 71 has a substantially square configuration defined by a base wall 173 and four upstanding walls 175. Three flexible snap-fit fingers 177, with inwardly projecting barbs, and one stationary barb 179 protrude from housing 71 proximate to an openly accessible mouth thereof. These barbs provide quick connect fastening to mating and relatively inflexible barbs 181 externally extending from cover 87. A T-shaped formation 191 projects from an external surface of an upstanding wall 175 for sliding engagement with a slotted receiving structure 193 of cover 40. A pair of longitudinal depressions are also juxtaposed adjacent to the slot within cover 40. This provides a dovetailing mechanical attachment means. A flexible snap-fit finger 195 flexibly extends from base 173 of housing 71. A barb located on a distal end of snap-fit finger 195 engages in a tool free and quick connect manner with a rib 197 integrally injection molded within cover 40.

Figure 5:
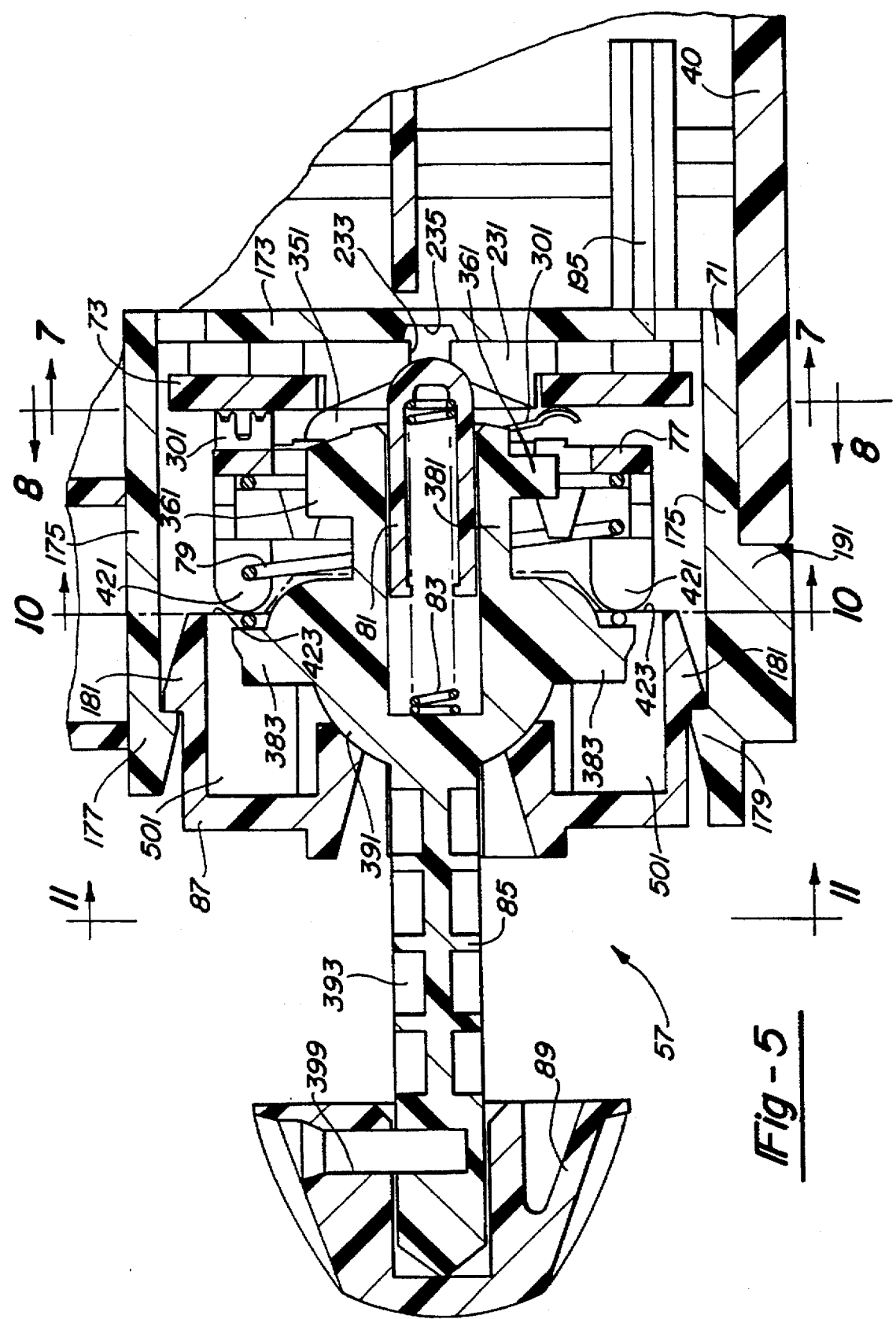
FIG. 5 is a longitudinal sectional view, taken along line 5—5 of FIG. 3, showing the preferred embodiment electrical switch of the present invention, illustrated in a neutral position.
Figure 6:
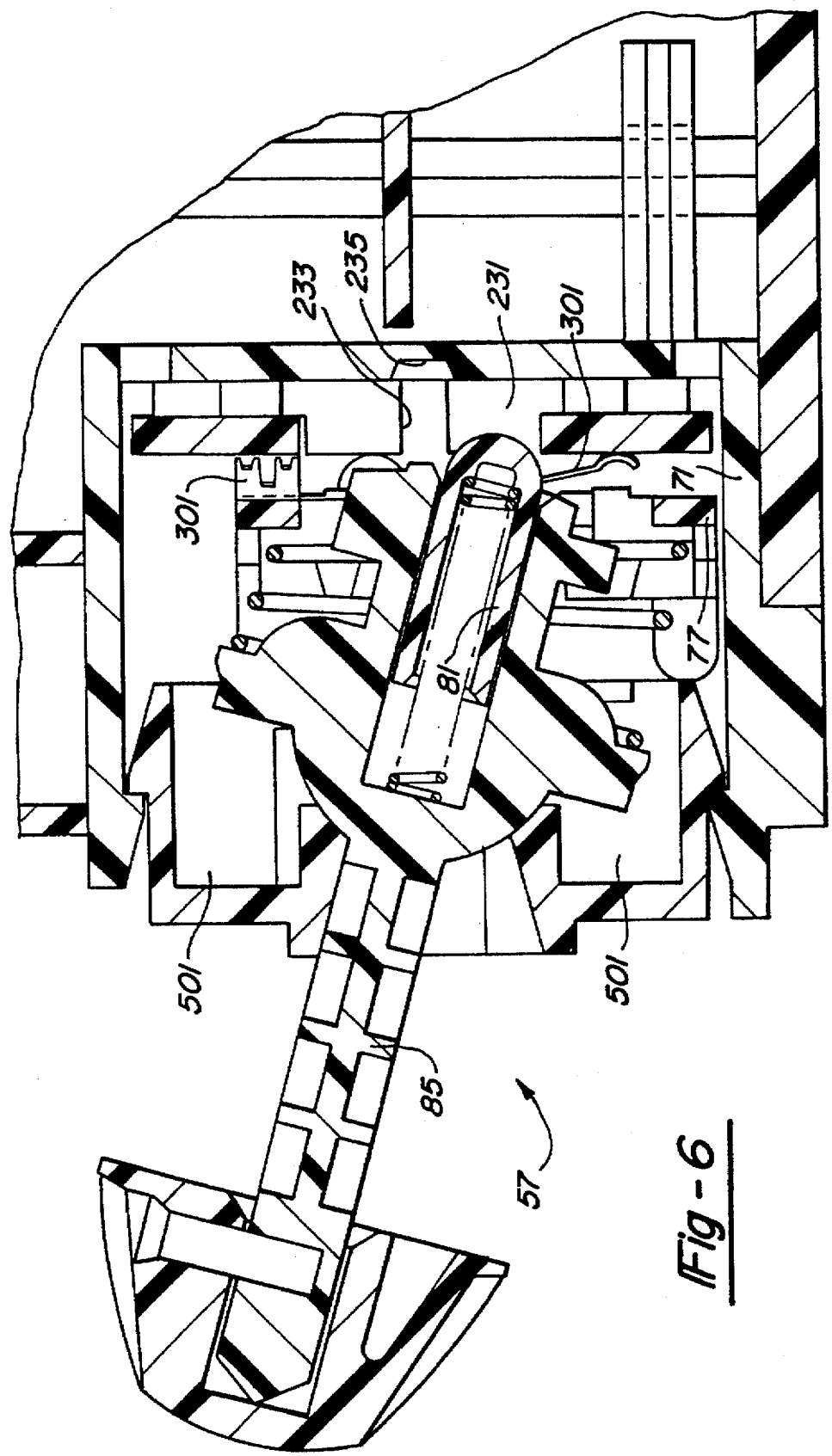
FIG. 6 is a longitudinal sectional view, similar to that of FIG. 5, showing the preferred embodiment electrical switch of the present invention, illustrated in a steering column downward tilting position.
Figure 7:
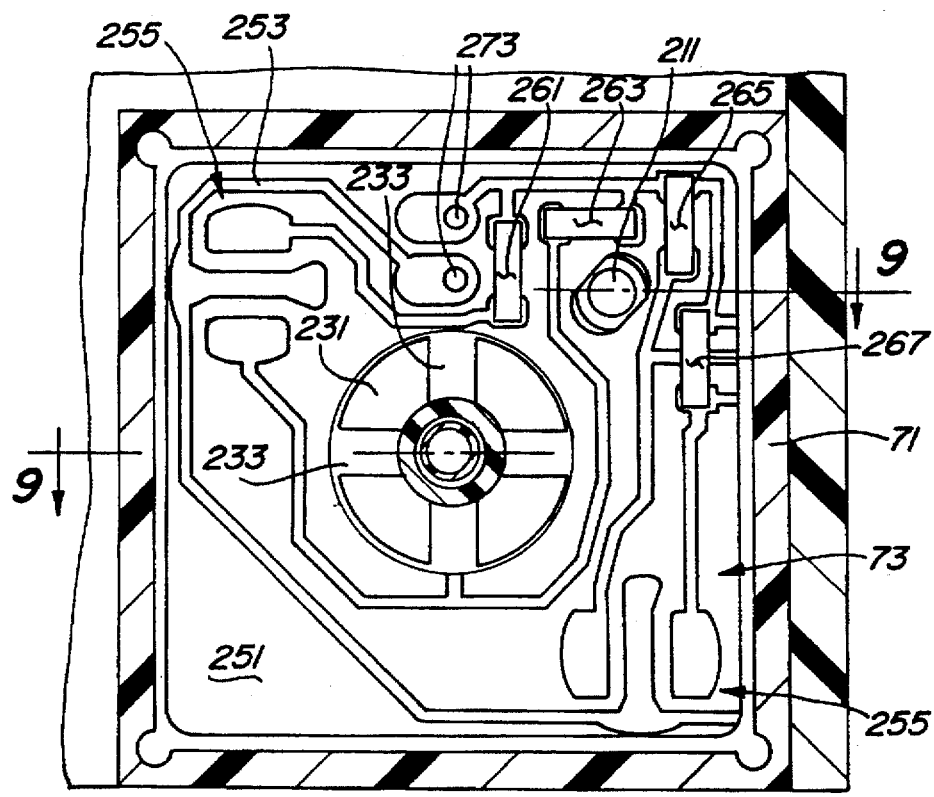
FIG. 7 is a cross sectional view, taken along line 7—7 of FIG. 5, showing the preferred embodiment electrical switch of the present invention.
Figure 8:
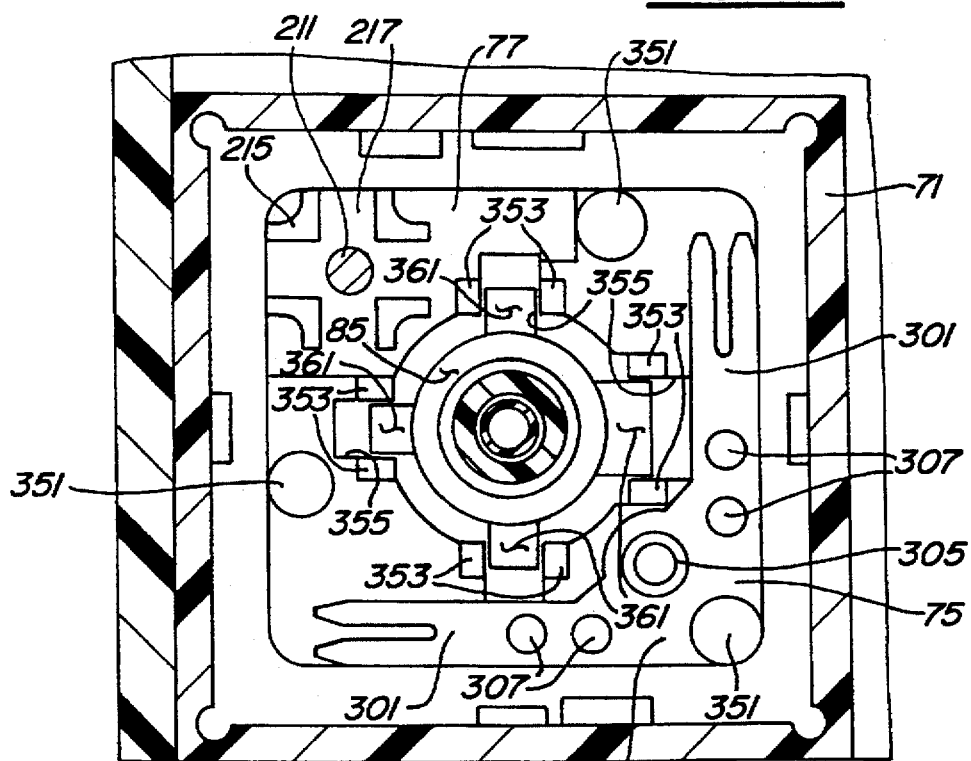
FIG. 8 is a cross sectional view, taken along line 8—8 of FIG. 5, showing the preferred embodiment electrical switch of the present invention.
Figure 10:
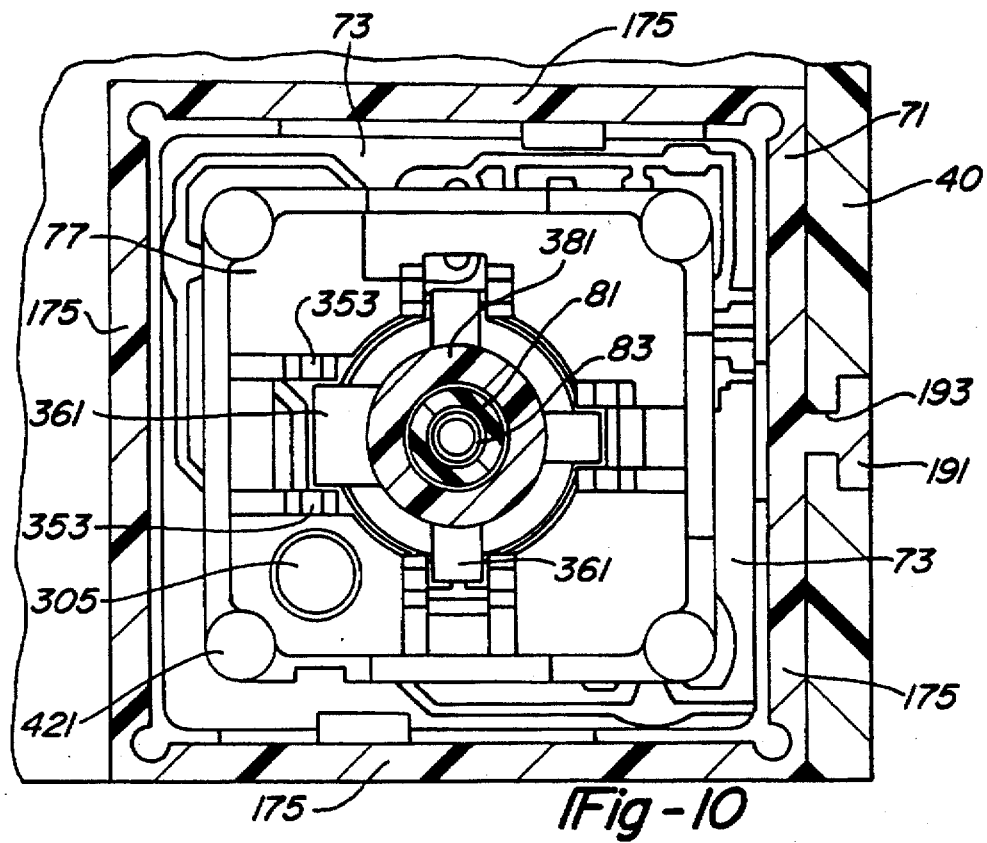
FIG. 10 is a cross sectional view, taken along line 10—10 of FIG. 5, showing the preferred embodiment electrical switch of the present invention.
Figure 11:
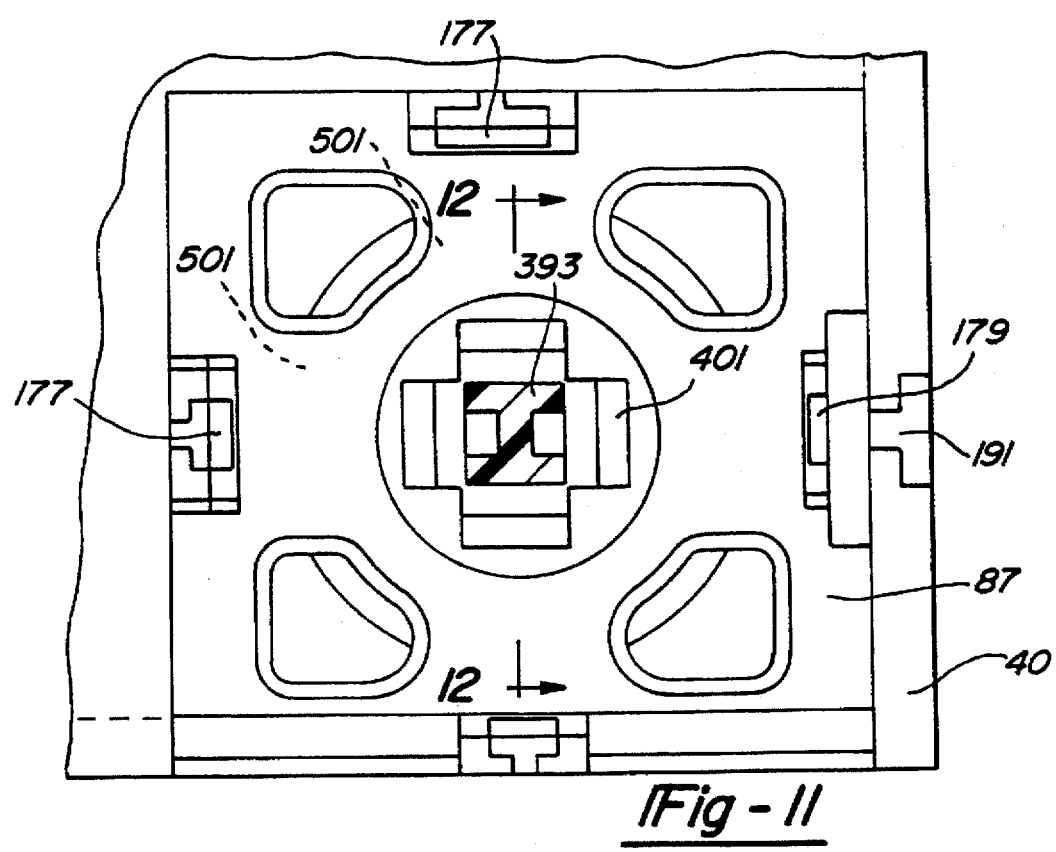
FIG. 11 is a cross sectional view, taken along line 11—11 of FIG. 5, showing the preferred embodiment electrical switch of the present invention.

Referring now to FIGS. 8 and 9, housing 71 further has a post 211 internally extending from face 173. Post 211 passes through a clearance hole 213 within printed circuit board 73 and engages within a receptacle 215 disposed on a lower surface of carrier 77. Receptacle 215 has a pair of crossing grooves 217 coinciding with cross-like aperture 61 (see FIG. 1) of bezel 59 (also see FIG. 1). Thus, post 211 acts to supplementally support a corner of carrier 77 and to assist in aligning carrier 77 during its linear movement. Housing 71 is preferably injection molded from 13% glass reinforced nylon 6/6 such as DuPont Zytel®. Referring now to FIGS. 5–7, a guide 231 is integrally formed centrally upon an interior surface of base 173 of housing 71. Guide 231 has a pair of crossed grooves 233 which intersect at a depressed detent 235. Grooves 233 of guide 231 are aligned with grooves 217 (see FIG. 7) of carrier 77 and cross-like aperture 61 (see FIG. 1) of bezel 59 (also see FIG. 1). A rounded end of plunger 81 rides along grooves 233 and detent 235. Thus, a definitive and precise four-way travel path for actuator 85 is provided.

Figure 4:
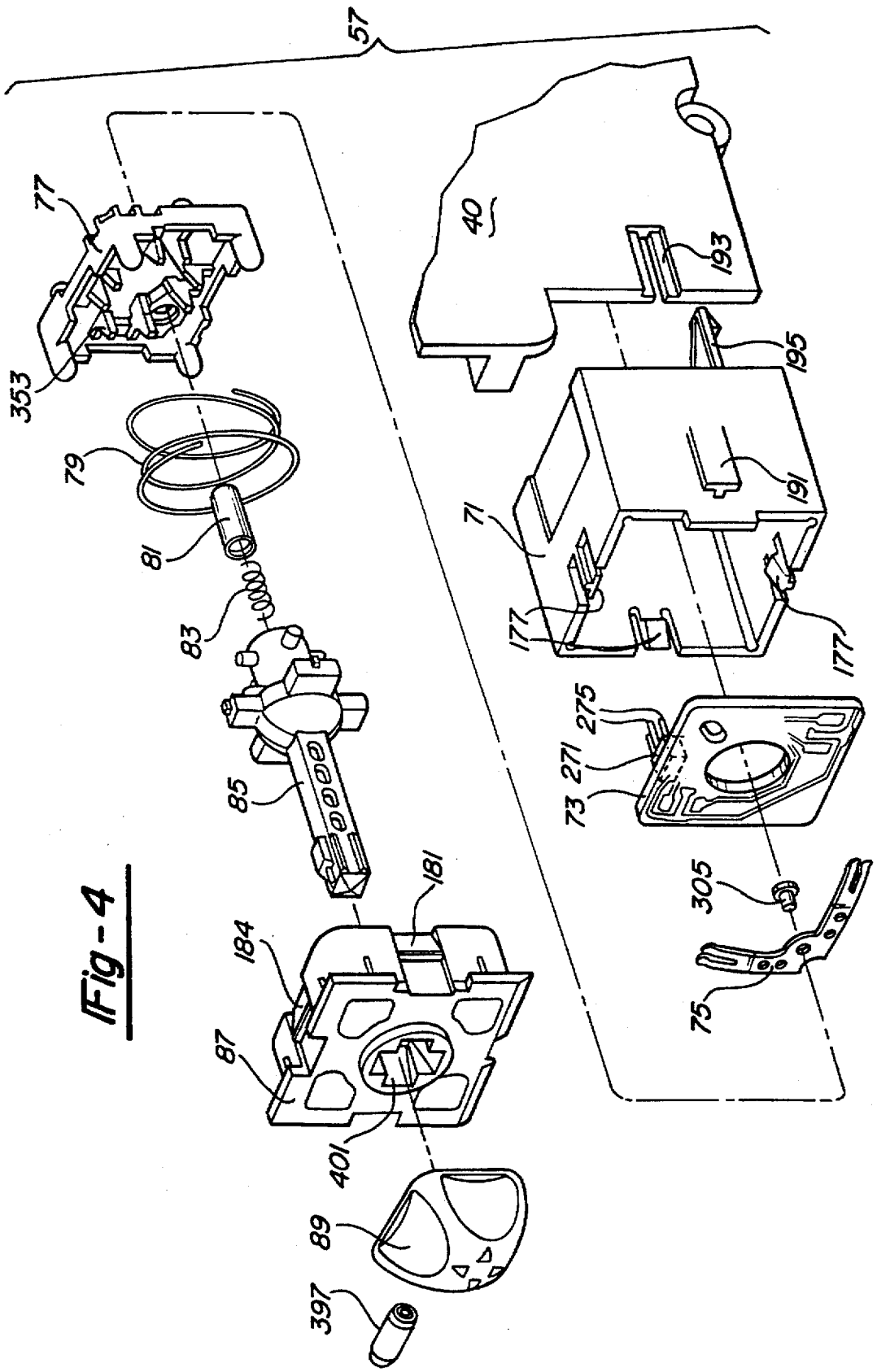
FIG. 4 is an enlarged exploded perspective view showing the preferred embodiment electrical switch of the present invention.

Printed circuit board 73 is illustrated in FIGS. 4, 5, and 7. Printed circuit board 73 has a substantially square peripheral shape made from the following material: 1.70/1.45 CEM-3 per ASTM D 1867–88 with 0.305 Kg/m$^2$ (1 ounce) having a double-sided copper base. The conductive circuits for conductive circuits or trace paths 253 are formed by copper electroplating per MIL-C-14550 0.458 Kg/m$^2$ (1.5 ounce/foot$^2$) ±20% sulfamate nickel upon all exposed copper 0.0203–0.00254, on both sides. Two sets of conductive means or pads 255 of paths 253 provide the switching contact nodes. A resistor 261 having 820 ohms ±5%, ¼ W provides a tilt up signal. A second resistor 263, having 2.2K ohms ±5%, ¼ W, provides a telescoping out signal. A third resistor 265, having 330 ohms±5%, ¼ W, provides a tilt down signal. A fourth resistor 267, having 1.5K ohms ±5%, ¼ W, provides a telescope in signal. All of the resistors are of a surface mount chip resistor variety soldered upon paths 253 through infrared reflow. Printed circuit board 73 is pressed into housing 71 such that guide 231 and post 211 can extend through clearance holes therein. As can be seen in FIGS. 4, 7 and 20, a header molex No. 22-23-2021 electrical connector 271 is soldered to paths 253 at location 273. A pair of generally stiff and elongated male terminal blades 275 project from electrical connector 271 for engagement within a mating electrical connector 277 soldered upon main circuit board 47. A polymeric snap-fit finger 279 also projects from electrical connector 271 for flexibly engaging into a depression within an exterior surface of mating connector 277. Thus, the electrical connection is made simultaneously with mechanically fastening electrical switch 71 to cover 40. Additional discretely wired pigtails, electrical connectors, the associated assembly costs, access and reliability problems are thereby eliminated. In an alternate construction, it is also envisioned that the switch housing may be omitted altogether such that the tilting/telescoping printed circuit board is integrated into the main turn signal printed circuit board with the other switch components riding directly thereupon.

The preferred construction and function of contactor 75 is shown in FIGS. 4–6, 8 and 14–16. Contactor 75 has a pair of bifurcated leaves 301 which are disposed at a right angle to each other and joined at a crotch 303. Alternately, each leaf 301 may not need to be bifurcated. Crotch 303 is fastened upon a lower surface of carrier 77 by a rivet 305 and four locator pins 307. Contactor 75 is preferably stamped from beryllium copper. Of course, other fastening means such as heat staking, hot air cold upsetting, screws or the like may be employed. When carrier 77 is assembled adjacent to printed circuit board 73, contactor 75 is compressed therebetween from a free position 309 to a flexed position 309'. Thus, cup-shaped bifurcated ends of each leaf 301 provide a wiping switch contact against the selected conductive means or pads 255. Grooved receptacle 215 further improves the accuracy and precision of movement of contactor 75 in relation to pads 255. It should be appreciated that the compressible contactor is more cost effective, easier to assemble and provides a more reliable electrical contact as compared to conventional spring and ball bearing or spring and U-shaped member constructions.

Referring now to FIGS. 4, 5, 8, 10, 13 and 17, carrier 77 further includes three lower bearing surfaces 351 which slidably ride along printed circuit board 73. These bearing surfaces 351 are integrally injection molded with carrier 77. Four sets of cradles 353 project from both sides of carrier 77, normal to a plane defined by printed circuit board pads 255 and adjacent to slots 355. A lower set of crossed arms 361 of actuator 85 movably engage within cradles 353 for causing linear movement of carrier 77 relative to the fixed printed circuit board 73 when actuator 85 is pivoted. An example of this can be observed by comparing the relative actuator and carrier positions of FIGS. 5 and 6. An upper set of bearing surfaces 421 extend from carrier 77 for movably riding along lower corner surfaces 423 of cover 87. Carrier 77 is preferably made from 13% glass reinforced nylon 6/6 such as DuPont Zytel®. Lower set of arms 361 of actuator 85 have either a cylindrical or frusto conical shape thereto of varying diameters in order to provide a keyholed alignment during assembly.

Actuator 85 can best be observed by reference to FIGS. 4, 5, 17 and 18. Actuator 85 includes a pedestal section 381 having a hollow cavity therein for receiving a finger or plunger 81 and return compression spring 83. Plunger 81 is preferably injection molded from molybdenum disulfide filled nylon 6/6 such as Nylatron grade GS while return spring 83 is made from music wire ASTM A228 with 12 active (14 total) coils. In an alternate embodiment, plunger 81 and return spring 83 may be replaced by an integrally formed finger, spring loaded ball bearing or other detent creating means.

A median set of crossed arms 383 project in a transverse manner from an upper portion of pedestal 381. Ribs 385 span between pedestal 381 and median arms 383. These median arms 383 are substantially aligned with lower arms 361. Centering compression spring 79 is compressibly trapped between arms 383 and carrier 77 thereby providing a biased centering action for moving actuator 85 toward the neutral and unswitched position, as shown in FIG. 5. Centering spring 79 further reduces the undesirable free play and sloppy movement found in many conventional switch designs. Centering spring 79 is preferably made from music wire ATSM A228 and has three active coils.

Actuator 85 further has a semi-spherical ball 391 positioned between median arms 383 and a shaft 393. Button 89 is mounted upon an end of shaft 393 by a press fit against a set of crush ribs 395 and through insertion of a spiral coiled roll pin 397 within a bore 399. Roll pin 397 is preferably made from carbon steel SAE 1070–1095. Actuator 85 must have cover 87 and bezel 59 (see FIG. 1) assembled thereto prior to attachment of button 89. Actuator 85 and button 89 are both preferably injection molded from 40% mineral/glass reinforced nylon 6 such as Allied Signal Capron®.

Referring to FIGS. 4, 5, 11 and 12, cover 87 has a tapered cross shaped orifice 401 through which shaft 393 of actuator 85 extends. Cover 87 further has a partially spherical support structure for mating with the matching semi-spherical ball 391 of actuator 85. This provides a journalled pivoting surface during actuator movement. The partially spherical support structure is not visible from an upper face (i.e., like shown in FIG. 11) of cover 87. Alternately, three triangularly displaced pins can interface against ball 391 instead of the preferred support structure 403. Cover 87 also serves to retain all of the internal components within housing 71. Median arms 383 of actuator 85 pivotably ride within channel recesses 501 of cover 87. Cover 87 is preferably injection molded from 13% glass reinforced nylon 6/6 such as DuPont Zytel®. It should be appreciated that the longitudinal length of shaft 393, as measured from the actuator pivot axis (defined by a radial center point of ball 391) in relation to the shorter longitudinal length of pedestal 381 and plunger 81, provides for an improved detenting and pivotal actuating feel to the vehicle driver. This precision of feel is further enhanced by use of multiple cross shaped openings and grooves for guiding and limiting movement of actuator 85. Centering spring 79 and the leaf spring nature of contactor 75 further assist in handling component tolerances and reducing free play and rattling of the electrical switch 57.

Figure 21:
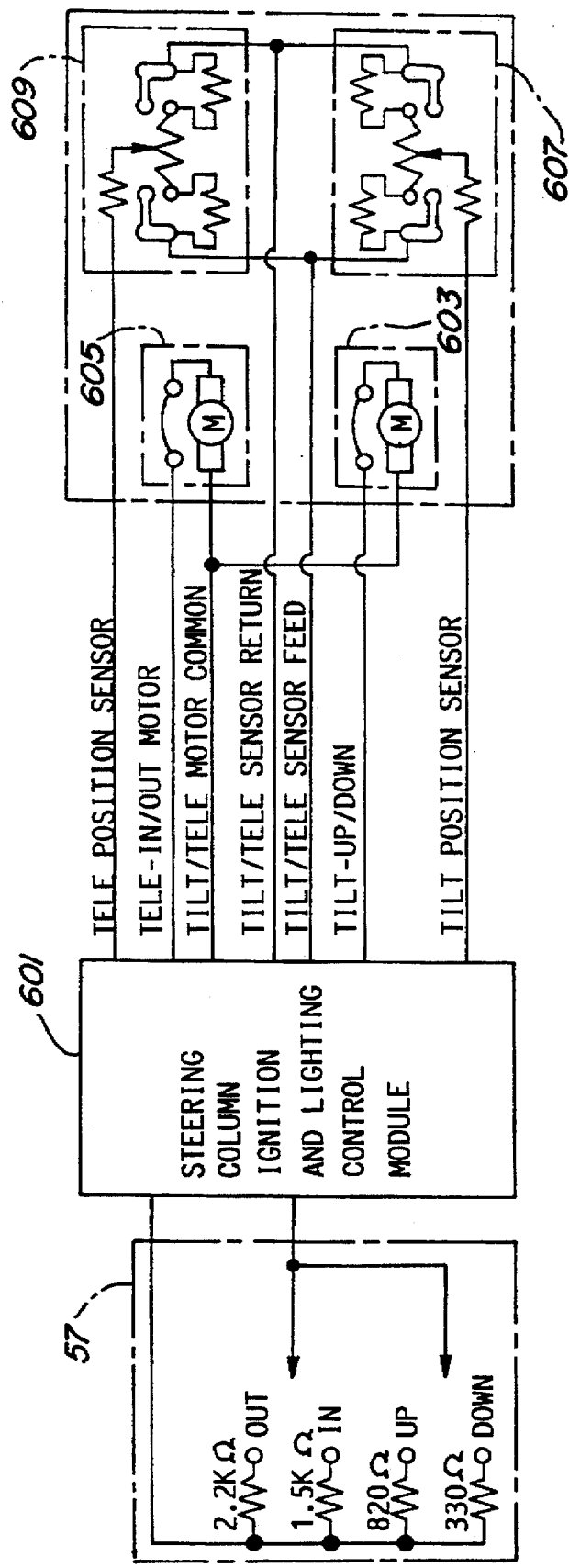
FIG. 21 is an electrical schematic diagram showing the preferred embodiment electrical switch of the present invention in combination with a portion of the vehicle electrical system connected thereto.

An electrical schematic diagram showing electrical switch 57 of the present invention is illustrated in FIG. 21. Electrical switch 57 includes the four resistors and a common trace. The contactor moves between the contact nodes. The common trace and a positive trace originate from a steering column ignition and lighting control module 601. Circuits connect control module 601 to a tilt motor 603 and a telescoping motor 605. Other circuits connect control module 601 to sensors 607 and 609.

Although the preferred embodiment of this electrical switch has been disclosed, it will be appreciated that various modifications may be made without departing from the present invention. For example, various aspects of the present invention may be incorporated into other two-way and four-way switches such as those used to operate exterior mirrors, power seats, power sunroofs, power windows or the like. Furthermore, the disclosed leaf spring can be replaced by two or more compression spring biased U-shaped conductive stampings, or two or more separate flexible leaf-like stamped members. It should also be appreciated that the receptacle and groove, as well as their engaging posts and plungers, may be reversed between components parts. Moreover, the dovetail and snap-fit constructions can be alternately configured to have different shapes or even reversed between component parts. Conductive stampings, deposit metal layers, conductive printed ink, flexible printed circuits or the like can also be used instead of a rigid printed circuit board. Various materials, resistor types and processes have been disclosed in an exemplary fashion, however, other materials, electronic components and processes may of course be employed. It is intended by the following claims to cover these and any other departures from the disclosed embodiments which fall within the true spirit of this invention.

The invention claimed is:

1. In combination, an electrical switch and a steering column, said combination comprising:

first conductive means for conducting electric current;

second conductive means for conducting electric current;

a carrier linearly movable relative to said first and second conductive means;

contactor means riding upon said carrier operable for conducting electric current between said first and second conducting means, wherein a back and forth movement of said contactor means along a first direction causes telescoping movement of the steering column and a back and forth movement of said contactor means along a second direction causes tilting movement of the steering column;

a nonpivoting post oriented substantially normal to a plane defined by surfaces of said first and second conductive means;

a receptacle having at least one groove for engaging with a distal end of said post; and said post and said receptacle assisting to align said carrier during movement.

2. The electrical combination of claim 1 further comprising:

an actuator assembly having a shaft with an occupant accessible button mounted on a first end thereof, said actuator assembly further having a pedestal segment with a finger projecting therefrom, said actuator assembly pivotable relative to said plane defined by said first and second conductive means;

at least one cradle projecting from at least one side of said carrier;

at least one lower arm protruding from said actuator and causing linear movement of said carrier upon movable engagement of said at least one lower arm with said at least one cradle; and a stationary guide having at least one groove for engaging with said finger.

3. The combination of claim 2 wherein said at least one groove of said guide includes a pair of crossed grooves oriented parallel to said plane, an intersection of said pair of crossed grooves defining a centralized detent for said finger.

4. The combination of claim 3 further comprising a switch housing having said post and said guide disposed thereupon.

5. The combination of claim 2 further comprising:

a return spring disposed within said pedestal segment;

said finger being defined as a longitudinally movable plunger outwardly biased by said return spring; and at least part of said pedestal segment of said actuator assembly extending through an aperture within said carrier, said actuator assembly pushing said carrier in response to pivoting actuation of said button.

6. The combination of claim 2 further comprising:

a partially spherical ball disposed on said actuator assembly;

a cover having support means for journally engaging with said ball, said cover being fixed relative to said first and second conductive means;

a set of median arms projecting from said actuator assembly; and a centering spring surrounding at least a portion of said pedestal segment and compressing said set of median arms away from said carrier.

7. The combination of claim 1 wherein said contactor means is further defined as a single stamped metallic member having a pair of bifurcated leaves projecting from a crotch, said crotch affixed to said carrier, said pair of bifurcated leaves movably and flexibly contacting against said first and second conductive means.

8. An electrical switch comprising an actuator, said actuator including:

a shaft with an occupant accessible button on a first end thereof;

a partially spherical ball joined to said shaft as a single, integral piece;

a pedestal segment longitudinally extending as part of said single, integral piece from said ball opposite from said shaft;

a first set of crossed arms projecting adjacent to said ball and transverse from said pedestal segment as part of said single, integral piece; and a second set of crossed arms projecting from said actuator in a substantially transverse manner.

9. The electrical switch of claim 8 wherein said actuator further includes:

a return spring disposed within said pedestal segment; and a longitudinally movable plunger outwardly biased by said return spring.

10. The electrical switch of claim 8 further comprising:

a first contact node;

a second contact node;

a carrier linearly movable relative to said first and second contact nodes;

centering means compressibly contained between said first set of crossed arms and said carrier for centeringly biasing said actuator toward a neutral and unswitched position;

contactor means mounted to said carrier for conducting electric current between said first and second contact nodes;

back and forth movement of said contactor means along a first direction actuable for causing telescoping movement of a steering column; and back and forth movement of said contactor means along a second direction actuable for causing tilting movement of said steering column.

11. The electrical switch of claim 8 wherein the spherical portion of said partially spherical ball faces away from said second set of crossed arms.

12. An electrical switch comprising;

contactor defined as a single stamped metallic member having a pair of bifurcated leaves flexibly projecting from a crotch;

two sets of switch node pads, each of said sets divided between at least three distinct contact nodes;

a first resistor electrically connected to a first of said contact nodes actuating a steering column tilt up signal;

a second resistor electrically connected to a second of said contact nodes actuating a steering column tilt down signal;

a third resistor electrically connected to a third of said contact nodes actuating a steering column telescopic extension signal; and a fourth resistor electrically connected to a fourth of said contact nodes actuating a steering column telescopic retraction signal.

13. The electrical switch of claim 12 wherein said bifurcated leaves each have a cup shape near a distal end thereof.

14. The electrical switch of claim 12 further comprising a printed circuit board including:

a pair of switch node pads each divided into at least three distinct whereby there exists at least six distinct contact nodes on said printed circuit board, said pair of leaves of said contactor selectively movable between said contact nodes of said printed circuit board.

15. In combination, an electrical switch for use in an automotive vehicle and a tilting and telescoping steering column, said electrical switch comprising:

a longitudinally elongated actuator pivotable along a cross-like pattern, at least one substantially transversely oriented surface integrally projecting from a longitudinal portion of said actuator, said actuator further includes a partially spherical ball, a longitudinally elongated shaft extending from said ball, said at least one substantially transversely oriented surface projecting from a median longitudinal portion of said actuator;

a centering spring biasing against said at least one surface of said actuator;

contact nodes;

a carrier linearly movable relative to said contact nodes, said carrier having at least one cradle movably engageable with said actuator;

a pair of leaves of a contactor mounted to said carrier conducting electric current between said contact nodes;

back and forth movement of said contactor along a first direction actuable causing telescoping movement of said steering column;

back and forth movement of said contactor along a second direction actuable causing tilting movement of said steering column;

a first resistor electrically connected to a first of said contact nodes selectively supplying a steering column tilt up signal;

a second resistor electrically connected to a second of said contact nodes selectively supplying a steering column tilt down signal;

a third resistor electrically connected to a third of said contact nodes selectively supplying a steering column telescopic extension signal;

a fourth resistor electrically connected to a fourth of said contact nodes selectively supplying a steering column telescopic retraction signal; and an occupant accessible button mounted on said actuator for selectively operating said switch.

* * * * *